US010012196B1

(12) United States Patent
Qi et al.

(10) Patent No.: US 10,012,196 B1
(45) Date of Patent: Jul. 3, 2018

(54) DUCT STRUCTURE FOR FUEL INJECTOR ASSEMBLY

(71) Applicant: Caterpillar Inc., Peoria, IL (US)

(72) Inventors: Yongli Qi, Peoria, IL (US); Kenth I Svensson, Peoria, IL (US); Glen Clifford Martin, Peoria, IL (US); Chad Palmer Koci, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/690,407

(22) Filed: Aug. 30, 2017

(51) Int. Cl.
*F02B 23/00* (2006.01)
*F02M 61/14* (2006.01)
*F02B 23/06* (2006.01)

(52) U.S. Cl.
CPC ......... *F02M 61/14* (2013.01); *F02B 23/0648* (2013.01); *F02B 23/0651* (2013.01); *F02B 23/00* (2013.01)

(58) Field of Classification Search
CPC ..... F02M 61/14; F02B 23/00; F02B 23/0648; F02B 23/0651
USPC ........................................ 123/470, 659, 298
See application file for complete search history.

(56) References Cited

U.S. PATENT DOCUMENTS

| 5,224,458 A * | 7/1993 | Okada .................. F02M 67/12 123/432 |
| 5,941,075 A * | 8/1999 | Ansart ...................... F23R 3/14 239/402 |
| 8,967,129 B2 | 3/2015 | Mueller |
| 2016/0298528 A1 | 10/2016 | Svensson |
| 2016/0298529 A1 | 10/2016 | Anders et al. |
| 2016/0298584 A1 | 10/2016 | Svensson et al. |
| 2017/0009712 A1 | 1/2017 | Svensson et al. |
| 2017/0114763 A1 | 4/2017 | Mueller |
| 2017/0114998 A1 | 4/2017 | Mueller |

FOREIGN PATENT DOCUMENTS

JP S59120715 7/1984

* cited by examiner

*Primary Examiner* — Mahmoud Gimie (57) ABSTRACT

A duct structure for a fuel injector assembly of an engine includes a first ring structure, a plurality of ducts, a plurality of posts, and an engagement structure. The fuel injector assembly includes a fuel injector having a plurality of orifices to discharge fuel. The first ring structure is configured to be coupled to a cylinder head of the engine, and defines a central axis. The ducts are circularly arrayed around the central axis, and are configured to provide passages to the fuel discharged from the fuel injector. The posts connect the ducts to the first ring structure. Further, the engagement structure is configured to engage with the fuel injector to align the ducts with the orifices such that each of the plurality of ducts is configured to receive fuel discharged from a corresponding one of the plurality of orifices.

20 Claims, 6 Drawing Sheets

DUCT STRUCTURE FOR FUEL INJECTOR ASSEMBLY

TECHNICAL FIELD

The present disclosure relates to a fuel injector assembly for an engine. More particularly, the present disclosure relates to a duct structure for the fuel injector assembly of the engine.

BACKGROUND

Modern combustion engines may include one or more cylinders as part of the engine. A cylinder head and an associated piston may define a combustion chamber therebetween. Fuel for combustion is directly injected into the combustion chamber by, for example, a fuel injector which is associated with the cylinder. The fuel injector has at least one orifice disposed such that it can directly inject fuel the combustion chamber.

Different mixtures and/or equivalence ratios of a fuel/air mixture may produce different results during combustion. A manner in which the injected fuel mixes and/or interacts with air and other environmental elements of the combustion chamber may impact the combustion process and associated emissions. Further, if the fuel and. air mixing is inadequate, then increased amounts of soot may form within the combustion chamber.

U. S. Pat. Publication Ser. No. 2016/0298529 discloses a conical duct structure disposed within a combustion chamber of an engine. The conical duct structure defines a plurality of ducts that form passageways corresponding to orifices of the fuel injector. Fuel jets discharged from the orifices of the fuel injector are channeled through the ducts into the combustion chamber.

SUMMARY OF THE INVENTION

According to an aspect of the disclosure a duct structure for a fuel injector assembly of an engine is disclosed. The fuel injector assembly includes a fuel injector having a plurality of orifices to discharge fuel. The duct structure includes a first ring structure, a plurality of ducts, a plurality of posts, and an engagement structure. The first ring structure is configured to be coupled to a cylinder head of the engine, and defines a central axis. The plurality of ducts is circularly arrayed around the central axis, and is configured to provide passages to the fuel discharged from the fuel injector. The plurality of posts connects the plurality of ducts to the first ring structure. Further, the engagement structure is configured to engage with the fuel injector to align the plurality of ducts with the plurality of orifices such that each of the plurality of ducts is configured to receive fuel discharged from a corresponding one of the plurality of orifices.

According to another aspect of the disclosure a fuel injector assembly for an engine having a cylinder head is disclosed. The fuel injector assembly includes a fuel injector and a duct structure. The fuel injector has a plurality of orifices to discharge fuel, and includes a mating structure disposed at an outer periphery of the fuel injector. The duct structure includes a first ring structure, a plurality of ducts, a plurality of posts, and an engagement structure. The first ring structure is configured to be coupled to the cylinder head of the engine, and defines a central axis. The plurality of ducts is circularly arrayed around the central axis, and is configured to provide passages to the fuel discharged from the fuel injector. The plurality of posts connects the plurality of ducts to the first ring structure. Further, the engagement structure is engaged with the fuel injector, aligning the plurality of ducts with the plurality of orifices such that each duct is configured to receive fuel discharged from a corresponding one of the plurality of orifices.

According to yet another aspect of the disclosure an engine is disclosed. The engine includes a cylinder defining a cylinder bore, and a cylinder head. The cylinder head is coupled to the cylinder, and has a flame deck surface. The engine further includes a combustion chamber, a fuel injector, and a duct structure. The combustion chamber is defined between the flame deck surface and a piston crown of a piston disposed within the cylinder bore. Also, the fuel injector has a plurality of orifices to discharge fuel into the combustion chamber, and includes a mating structure disposed at an outer periphery of the fuel injector. The duct structure is disposed within the combustion chamber, and includes a first ring structure, a plurality of ducts, a plurality of posts, and an engagement structure. The first ring structure is coupled to the cylinder head, and defines a central axis. The plurality of ducts is circularly arrayed around the central axis. The central axis is aligned with a longitudinal axis of the fuel injector. The plurality of ducts provides passages to the fuel discharged from the fuel injector. Further, the plurality of posts connects the plurality of ducts to the first ring structure. Furthermore, the engagement structure is engaged with the fuel injector, aligning the plurality of ducts with the plurality of orifices such that each duct is configured to receive fuel discharged from a corresponding one of the plurality of orifices.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts. Also, wherever possible, the same reference numbers will be used throughout the drawings to refer to the same or the like parts.

Figure 1:
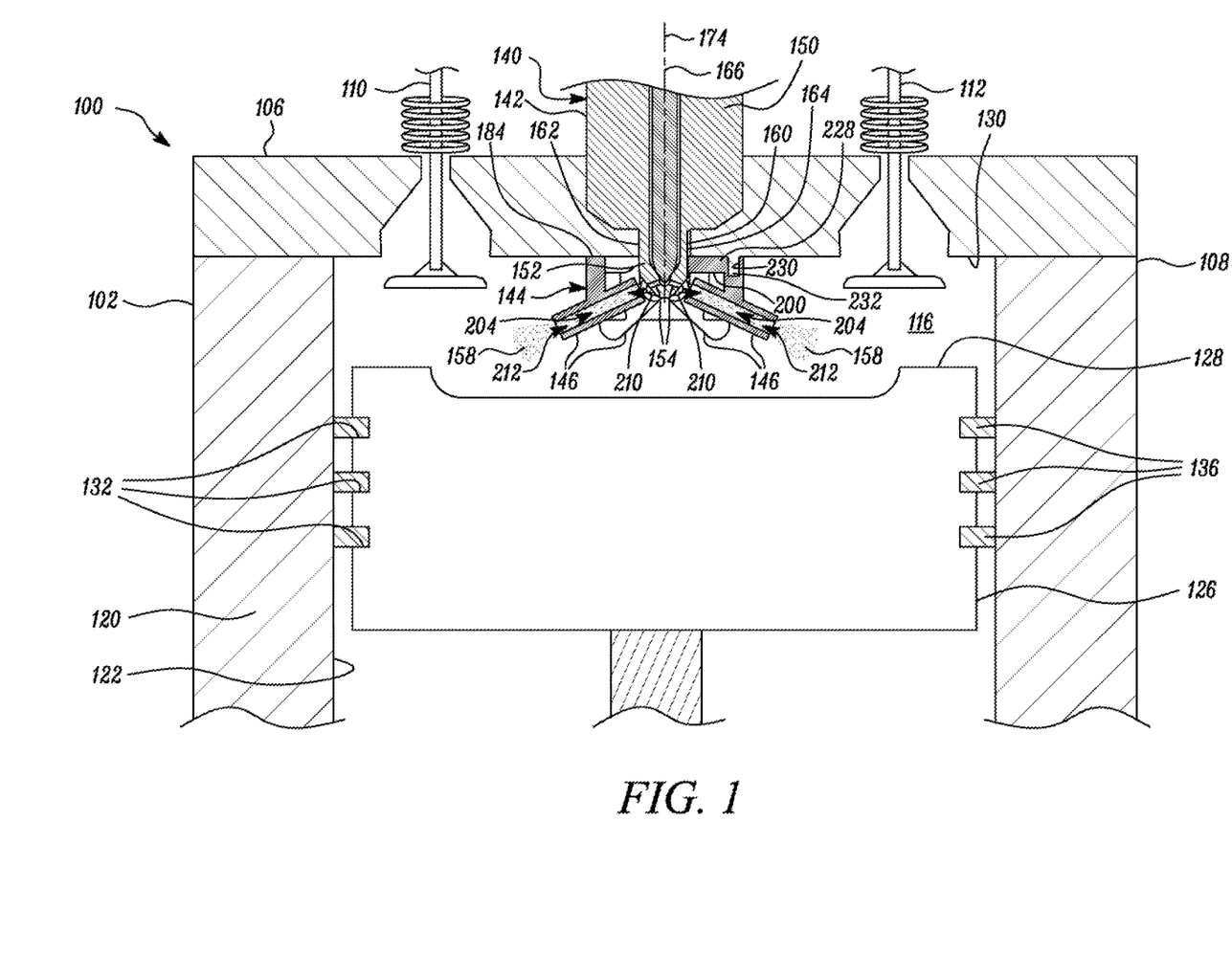
FIG. 1 illustrates a sectional view of an engine including a fuel injector assembly having a duct structure, in accordance with an embodiment of the disclosure.

Referring to FIG. 1, one exemplary embodiment of an engine 100 is disclosed. The engine 100 may be an internal combustion engine and may include a diesel engine, a gasoline engine, a gas engine, a two-stroke engine, a fourstroke engine, or any other similar internal combustion engine known in the art. The engine 100 may include a cylinder 102, a cylinder head 106 coupled to a first end 108 of the cylinder 102, a crankcase (not shown) coupled to a second end of the cylinder 102. The cylinder head 106 may act as a support structure for mounting various other components of the engine 100 such as an intake valve 110, an exhaust valve 112, etc. The cylinder head 106 may include various features such as an intake conduit for allowing intake of air/exhaust gases into a combustion chamber 116 and an exhaust conduit for facilitating discharge of exhaust gases from the combustion chamber 116.

The cylinder 102 includes a cylindrical wall 120 that defines a cylinder bore 122 extending from the first end 108 to the second end. The engine 100 further includes a piston 126 that is disposed within the cylinder bore 122, and is configured to reciprocate within the cylinder bore 122 between a top dead center (TDC) of the cylinder 102 and a bottom dead center (BDC) of the cylinder 102. The piston 126 includes a piston crown 128 that faces a flame deck surface 130 of the cylinder head 106. The piston 126 may further include other structural features, such as a piston howl to facilitate combustion of a fuel, a plurality of grooves 132 to receive a plurality of piston rings 136, etc.

Again referring to FIG. 1, the engine 100 includes a fuel injector assembly 140 having a fuel injector 142, and includes a duct structure 144 including a plurality of ducts 146 disposed within the combustion chamber 116. The combustion chamber 116 is defined as an enclosure between the flame deck surface 130, the piston crown 128 and the cylinder bore 122 of the cylinder 102. Therefore, the combustion chamber 116 is bound at one end by the flame deck surface 130 of the cylinder head 106, and bound at another end by the piston crown 128 of the piston 126. Further, the combustion chamber 116 may be in fluid communication with the fuel injector 142 to receive fuel from the fuel injector 142.

Figure 2:
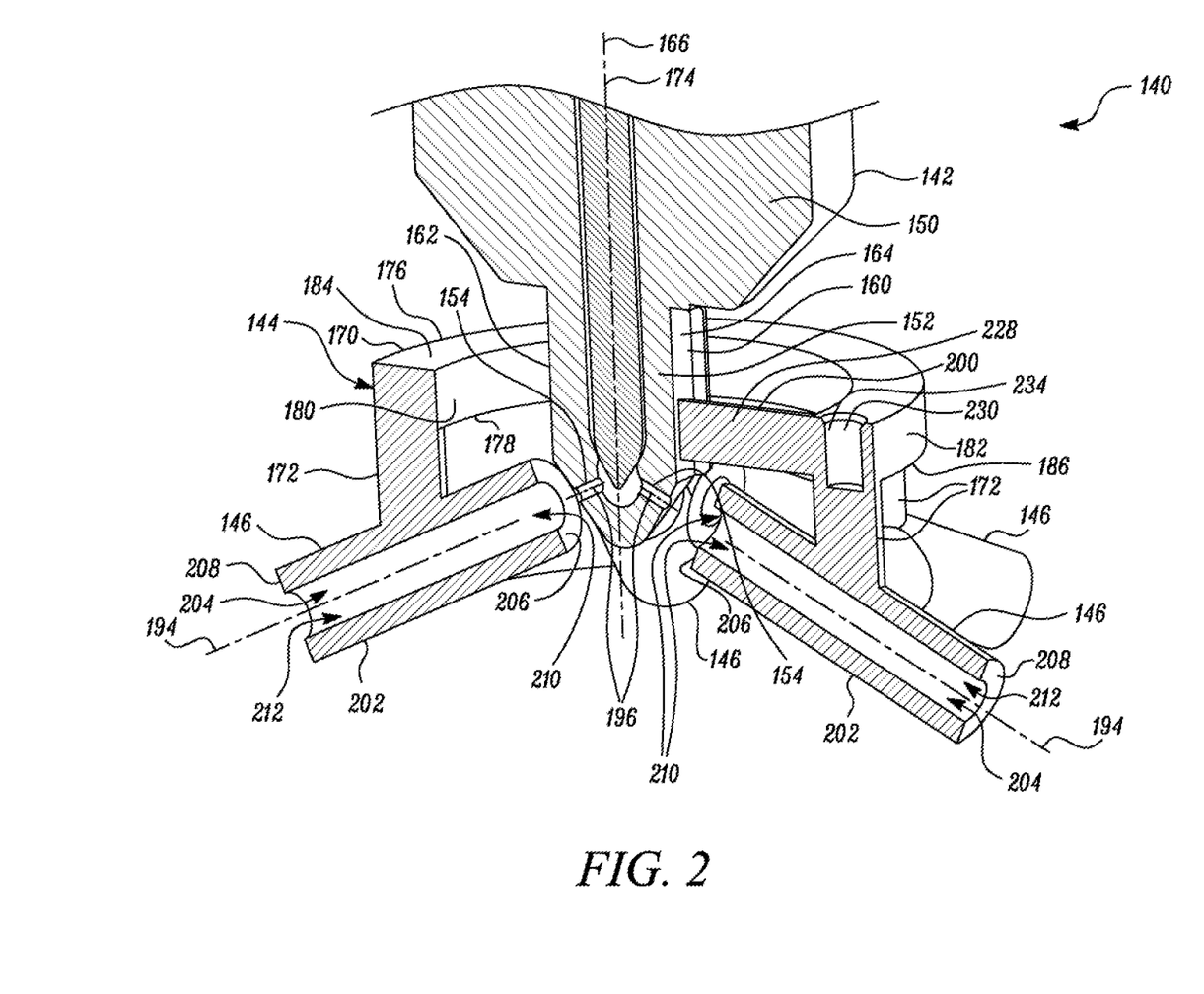
FIG. 2 illustrates an enlarged sectional view of the fuel injector assembly of FIG. 1 depicting the fuel injector engaged with the duct structure, in accordance with an embodiment of the disclosure.
Figure 3:
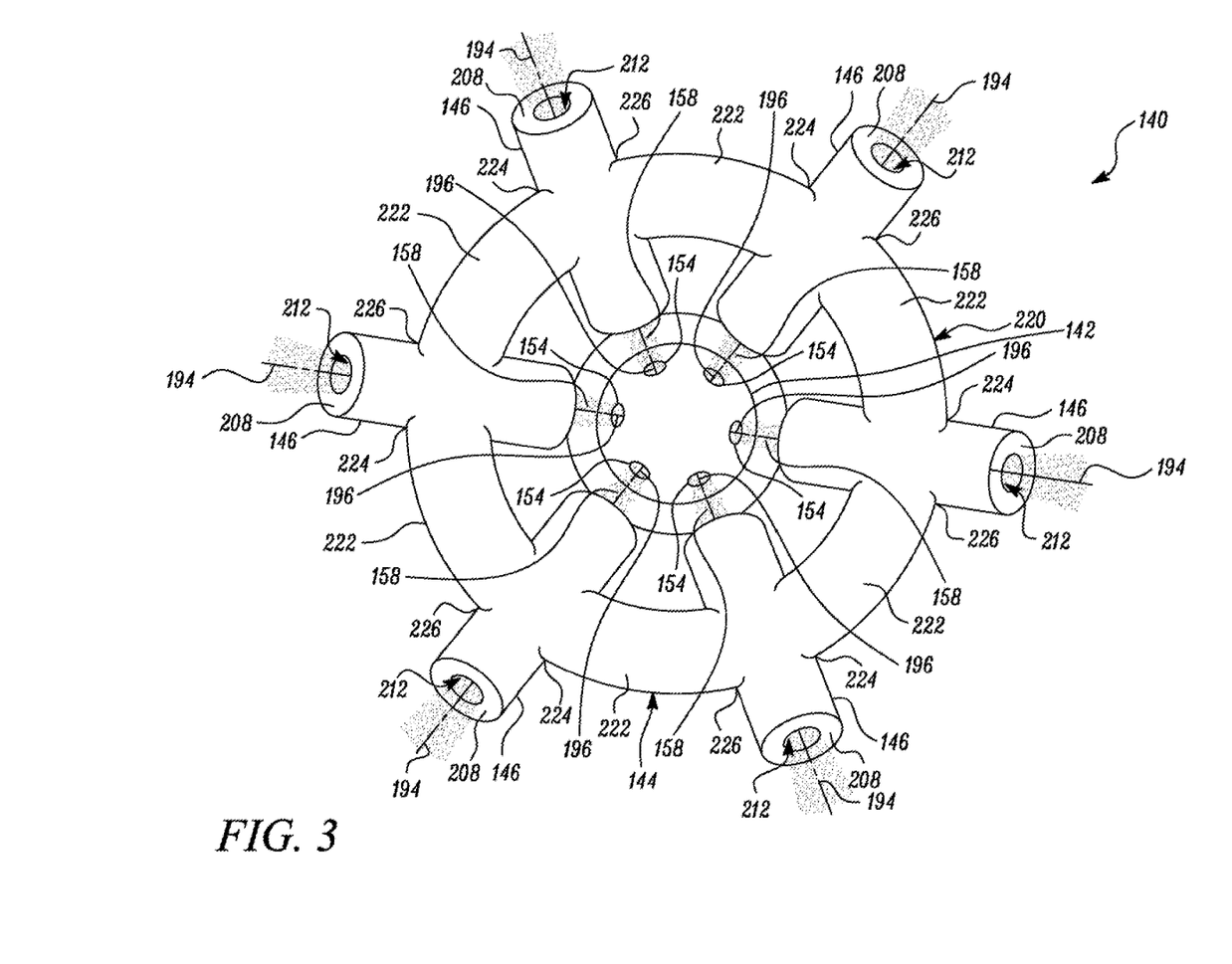
FIG. 3 illustrates a bottom view of the fuel injector assembly of FIG. 1, in accordance with an embodiment of the disclosure.
Figure 4:
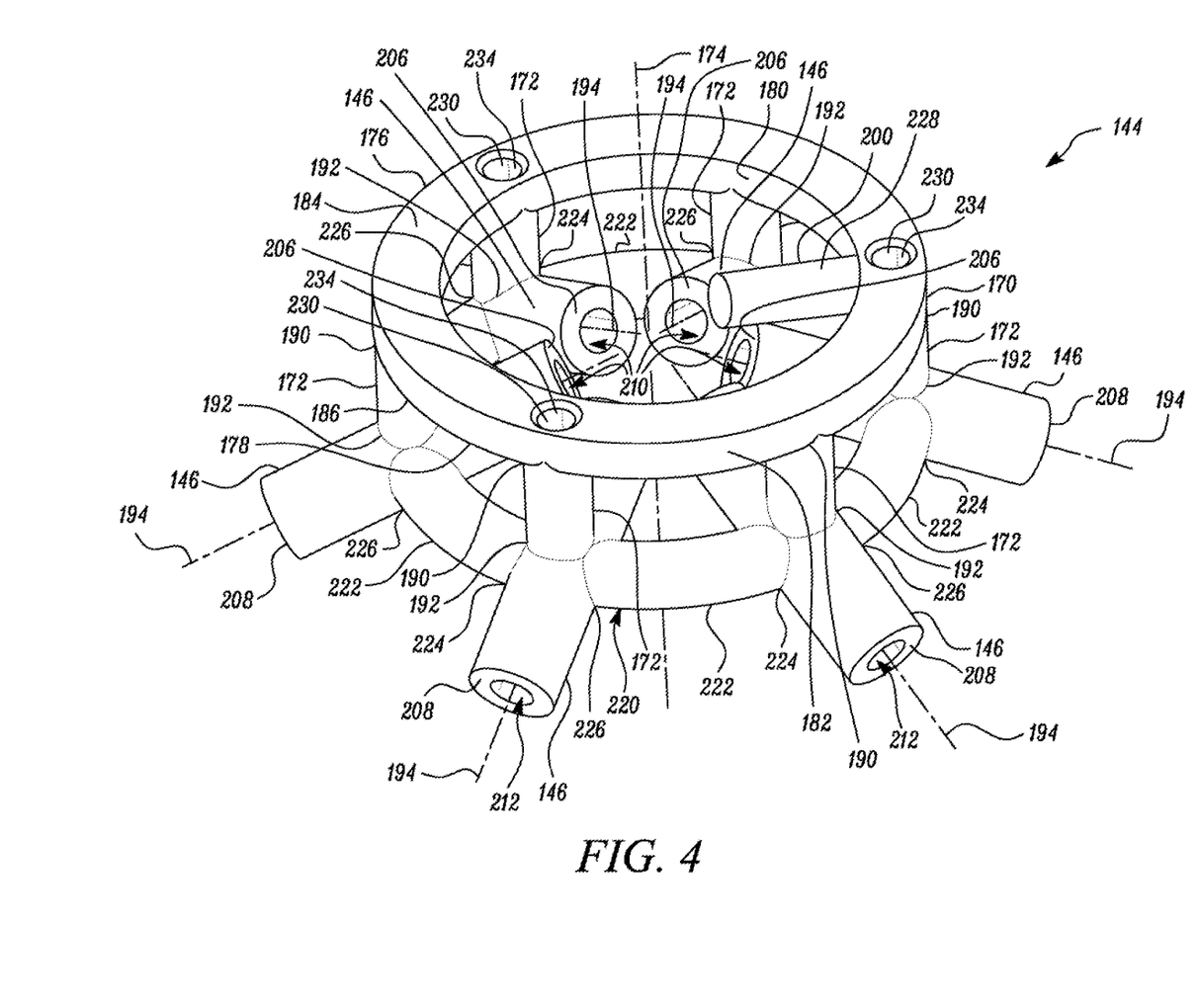
FIG. 4 illustrates a perspective view of the duct structure of FIG. 1, in accordance with an embodiment of the disclosure.
Figure 5:
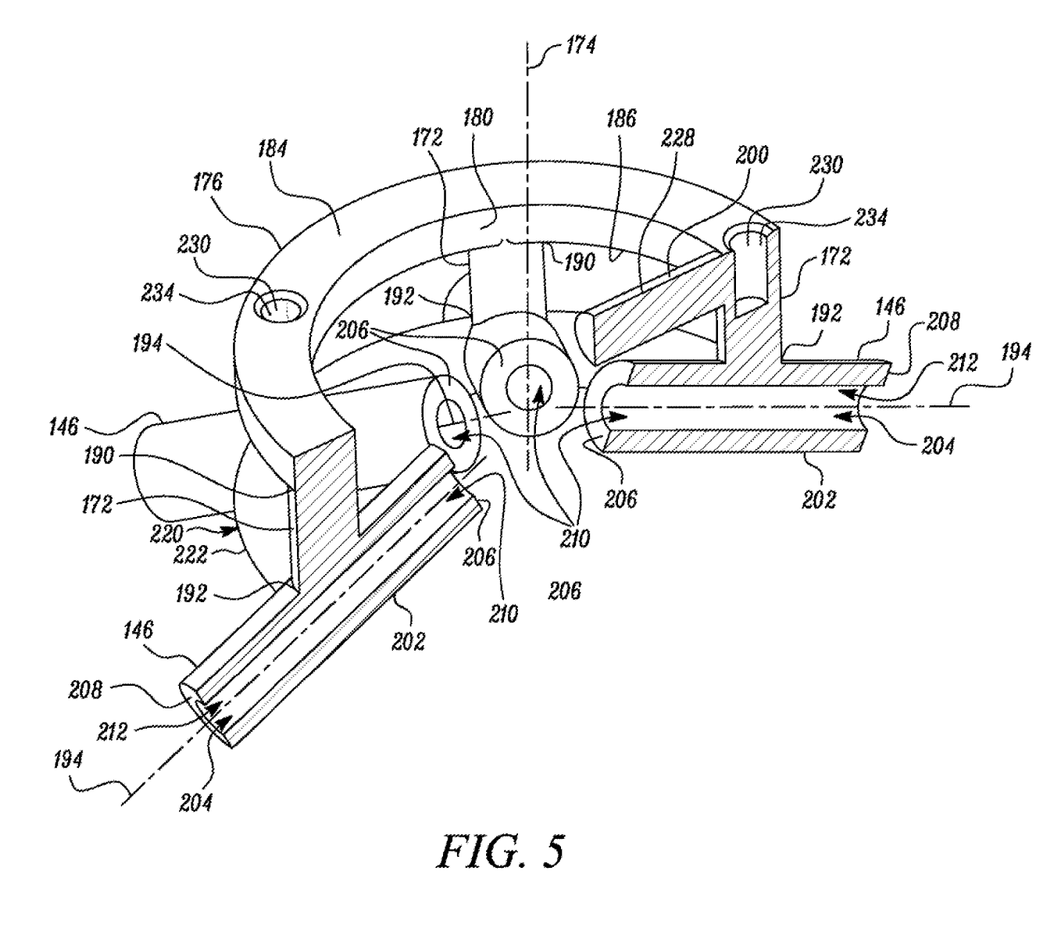
FIG. 5 illustrates a sectional perspective view of the duct structure of FIG. 4, in accordance with an alternative embodiment of the disclosure.
Figure 6:
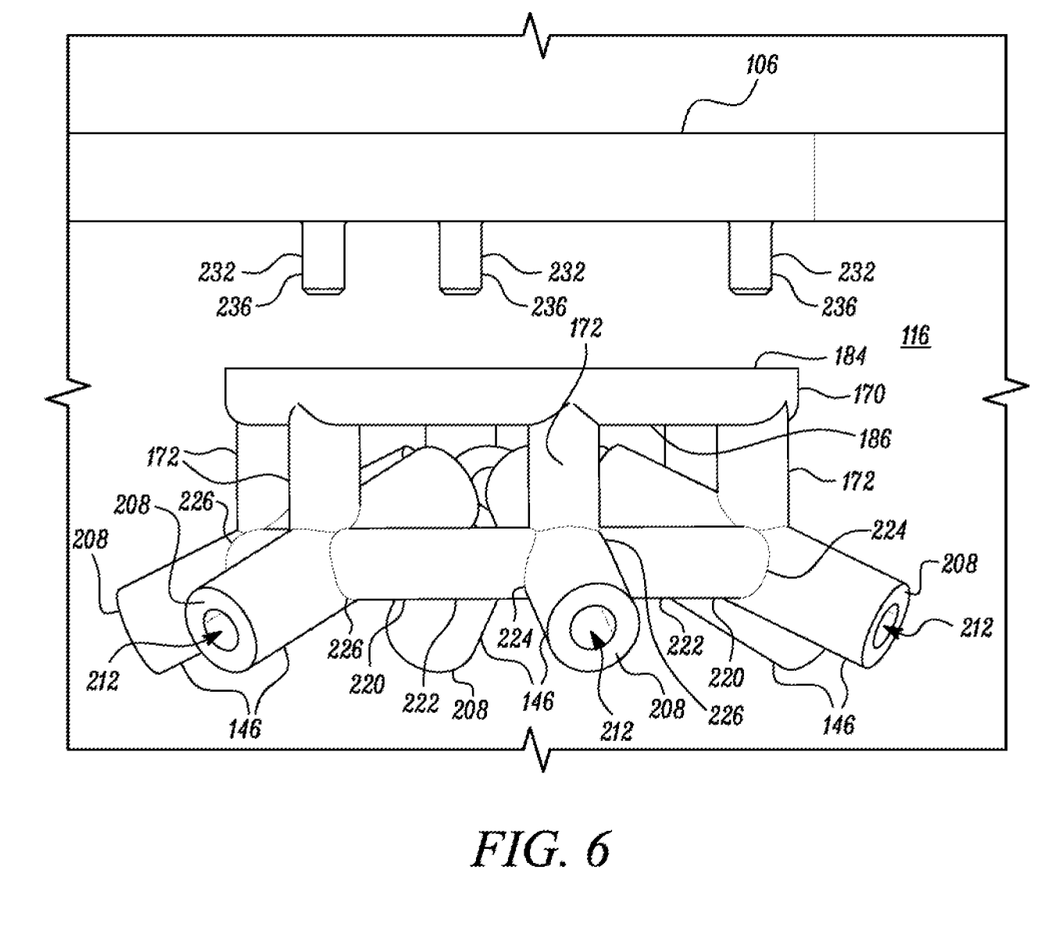
FIG. 6 illustrates the duct structure removed from a cylinder head of the engine, and depicting a coupling structure of the cylinder head, in accordance with an embodiment of the disclosure.

Referring to FIG. 1, FIG. 2, and FIG. 3, the fuel injector 142 may be mounted to the cylinder head 106, and includes a body 150 having a tip portion 152 protruding within the combustion chamber 116 through the flame deck surface 130. The fuel injector 142 includes a plurality of orifices 154 formed at the tip portion 152 to discharge/inject fuel into the combustion chamber 116 as, for example, a plurality of fuel jets 158. The plurality of fuel jets 158 discharged by the fuel injector 142 are received by the plurality of ducts 146.

Further, the fuel injector 142 includes a mating structure 160 disposed at an outer periphery 162 of the fuel injector 142. As shown, the mating structure 160 may be disposed or formed at the outer periphery 162 of the tip portion 152 of the fuel injector 142. The mating structure 160 may be configured to engage with the duct structure 144 to align the plurality of orifices 154 to the plurality of the ducts 146. Thus, upon engagement of the mating structure 160 with the duct structure 144, each of the plurality of orifices 154 aligns with a corresponding one of the plurality of ducts 146. In certain implementations, as shown in FIG. 2, the mating structure 160 may include one or more grooves 164 (only one groove 164 shown) extending radially inwardly from the outer periphery 162 of tip portion 152 the body 150. In such a case, the mating structure 160 may extend only through a part of a thickness of the body 150. Thus, the mating structure 160 may be a blind groove. Alternatively, the mating structure 160 may be one or more protrusions (not shown) extending radially outwardly from the outer periphery 162 of the tip portion 152 of the body 150. Although the mating structure 160 is contemplated as the grooves 164 or the protrusions, it may be appreciated that the mating structure 160 may be any other structure such as a spline, a step, or any other suitable structure, configured to align each orifice 154 of the fuel injector 142 with a corresponding one of the plurality of ducts 146.

The duct structure 144 is coupled and mounted to the cylinder head 106. The duct structure 144 may be coupled to the cylinder head 106 such that the plurality of ducts 146 is disposed into the combustion chamber 116, and the plurality of ducts 146 are arrayed around a longitudinal axis 166 of the fuel injector 142. The duct structure 144 may be disposed within a flame region of the combustion chamber 116. The flame region may be defined as a region of the combustion chamber 116 extending from the flame deck surface 130 to the piston crown 128, when the piston 126 is at or close to a maximum compression distance or at a TDC position within the cylinder 102. The duct structure 144 may be coupled to the cylinder head 106 by bolts, press fitting, a threaded connection, or any other suitable mechanism.

Referring to FIGS. 1 to 6, the duct structure 144 includes a first ring structure 170 and a plurality of posts 172 extending from the first ring structure 170. The first ring structure 170 is annular or ring shaped that defines a central axis 174 (best shown in FIG. 4), and may include a first axial end 176 and a second axial end 178 The first ring structure 170 may further include an inner circumferential surface 180 and an outer circumferential surface 182 defined around the central axis 174. Further, the first ring structure 170 extends axially about the central axis 174 front the first axial end 176 to the second axial end 178. The first axial end 176 defines a first end surface 184 that may contact or abut the cylinder head 106, and the second axial end 178 defines a second end. surface 186 that may be revealed to the combustion chamber 116 in an assembly of the first ring structure 170 to the cylinder head 106. In certain implementations, the first end surface 184 and the second end surface 186 may be substantially flat, and may be substantially perpendicular to the central axis 174. The first ring structure 170 is configured to be coupled to the cylinder head 106 of the engine 100. In an embodiment, the first end surface 184 of the first ring structure 170 may be configured to abut and be coupled to the flame deck surface 130 of the cylinder head 106.

The plurality of posts 172 connects the plurality of ducts 146 to the first ring structure 170, The plurality of posts 172 extends in an axial direction from the first ring structure 170 to the plurality of ducts 146. As shown, each post 172 includes a first end 190 connected with the second end surface 186 of the first ring structure 170, and a second end 192 connected with a corresponding one of the plurality of ducts 146. Each post 172 may be connected to a middle portion of the corresponding duct 146, as shown. Alternatively, each post 172 may be connected to an end portion of the corresponding duct 146. The plurality of posts 172, and hence the first ring structure 170, act as a support structure for supporting, and positioning the plurality of ducts 146 within around the central axis 174 of the first ring structure 170. Thus, each post 172 acts as a vertical column of the duct structure 144, supporting and connecting a corresponding one of the plurality of ducts 146 to the first ring structure 170. In certain implementations, each post 172 may be a single solid unitary body and includes a cylindrical shape—although it is possible for the post 172 to include a variety of shapes, such as a cuboidal shape, or an elliptical cross-sectional shape, or an irregular shape. The plurality of the posts 172 is arrayed in a circular configuration around the central axis 174 of the first ring structure 170. The posts 172 are arrayed in the circular configuration such that each post 172 is substantially parallel to the central axis 174. Thus, the plurality of posts 172 extends from the first ring structure 170 in a direction substantially parallel to the central axis 174. Gaps may exist between successive posts 172 along the array of the posts 172. In an embodiment, gaps between successive posts 172 are equal. In an embodiment, a number of the posts 172 may be based on a number of the ducts 146. As shown, the number of the posts 172 is equal to the number of the ducts 146. It is also possible for each post 172 to be tilted relative to the central axis 174.

The duct structure 111 may be disposed and arranged in the flame region of the combustion chamber 116 such that a fuel jet 158 discharged by each orifice 154 of the fuel injector 142 enters substantially entirely into a corresponding one of the plurality of ducts 146. In an embodiment, the duct structure 144 may be positioned inside the combustion chamber 116 such that the plurality of ducts 146 are arranged/arrayed in a circular configuration around the longitudinal axis 166 of the fuel injector 142. In such a case, the central axis 174 is aligned with the longitudinal axis 166 of the fuel injector 142, and a duct axis 194 of each duct 146 defines an angle relative to the longitudinal axis 166 of the fuel injector 142. Further, the duct structure 144, and therefore, the plurality of ducts 146 is arranged such that the duct axis 194 of each duct 146 is aligned with an orifice axis 196 of a corresponding one of the plurality of orifices 154. Such an alignment of the ducts 146 with the orifices 154 is facilitated by an engagement of an engagement structure 200 (details of the engagement structure 200 is described later) of the duct structure 144 with the mating structure 160 of the fuel injector 142. The orifice axis 196 of the orifice 154 may be defined as a central axis extending along a length of the orifice 154. Also, the duct axis 194 of each duct 146 may be defined as a central axis extending along a length of the duct 146.

The plurality of ducts 146 is circularly arrayed around the central axis 174 of the first ring structure 170 to provide passages to the fuel discharged from the fuel injector 142. Each duct 146 is defined by a tubular structure having a tubular wall 202 defining a passage 204 of the duct 146. As shown, each duct 146 includes a first end 206 disposed proximal to central axis 174 and configured to be positioned proximal to the fuel injector 142, and a second end 208 disposed distal to the central axis 174 and configured to be positioned away from the fuel injector 142. Further, each passage 204, and therefore each duct 146, includes an inlet opening 210 defined at the first end 206, and an outlet opening 212 defined at the second end 208. To ensure that most of, if not all, of the fuel of each fuel jet 158 enters the corresponding duct 146 upon being injected by the fuel injector 142, an opening width of the inlet opening 210 of each duct 146 may be greater than a width of a corresponding fuel jet width at the first end 206 of the duct 146. Further, the duct structure 144 is coupled with the cylinder head 106 and arranged within the combustion chamber 116 such that inlet openings 210 of the ducts 146 may be disposed/positioned below outlets of the orifices 154. Such a positioning of the ducts 146 may be facilitated by heights of the posts 172, or a width of the first ring structure 170, or a combination thereof.

Also, a structure of each duct 146 may converge and/or diverge in a flow direction of the fuel jets 158. In an embodiment, the ducts 146 may be divergent ducts that enable a divergence of fuel jets 158 in a flow direction of the fuel jets 158. "Divergence in a flow direction of the fuel jets 158," as defined herein with reference to ducts 146, generally refers to a duct having a passage with a width that increases along a length of the duct, in the general direction of the flow of the fuel jets. Alternatively, the ducts 146 may be convergent ducts that enable a convergence of the fuel jets 158 in a flow direction of the fuel jets 158. "Convergence in a flow direction of the fuel jets 158," as defined herein with reference to ducts 146, generally refers to a duct having a passage with a width that decreases along length of the duct, in the general direction of the flow of the fuel jets.

The duct structure 144 may further include a second ring structure 220 coupled to the plurality of ducts 146. The second ring structure 220 may connects the plurality of ducts 146 with each other. The second ring structure 220 may be disposed axially spaced apart from. the first ring structure 170, and may be disposed proximate to the second ends 192 of the plurality of posts 172. The second ring structure 220, therefore, is disposed at a distance from the cylinder head 106 in an assembled configuration of the duct structure 144 with the cylinder head 106. In an embodiment, the second ring structure 220 may include or be formed by a plurality of arcuate sections 222, with each arcuate section 222 having a first curvature end 224 and a second curvature end 226. Each arcuate section 222 of the plurality of arcuate sections 222 connects one of the plurality of ducts 146 with a successive one of the plurality of ducts 146 along a circular array of the plurality of ducts 146. In such a case, the first curvature end 224 of each arcuate section 222 is attached with one duct 146 and the second curvature end 226 of the arcuate section 222 is attached with an adjacent, successive duct 146, along the array of ducts 146. In this manner, the plurality of arcuate sections 222 is connected with the plurality of ducts 146. In an embodiment, a diameter of the second ring structure 220 may be different from a diameter of the first ring structure 170. Alternatively, the diameter of the second ring structure 220 may be equal to the diameter of the first ring structure 170. In an embodiment, the posts 172 may extend from the first ring structure 170 to the arcuate sections 222 of the second ring structure 220. In such a case, the second ends 192 of the posts 172 are connected to the arcuate sections 222 to support the ducts 146.

The duct structure 144 further includes the engagement structure 200 that is configured to engage with the fuel injector 142 to align the plurality of ducts 146 with the plurality of orifices 154 such that each duct 146 is configured to receive a fuel jet 158, and hence fuel discharged from a corresponding one of the plurality of orifices 154. In certain implementations, the engagement structure 200 is configured to align the duct axis 194 of each duct 146 with the orifice axis 196 of the one of the plurality of orifices 154. In an embodiment, the engagement structure 200 may be one or more protrusions 228 (only one protrusion 228 shown) extending radially inwardly from the first ring structure 170, such as from the inner circumferential surface 180 of the first ring structure 170, towards the central axis 174 of the first ring structure 170. The engagement structure 200 engages with the mating structure 160 of the fuel injector 142 to align the plurality of ducts 146 with the plurality of orifices 154 of the fuel injector 142. As shown, the one or more grooves 164 engage with the one or more protrusions 228 for aligning the plurality of ducts 146 with the plurality of orifices 154.

In an embodiment, the engagement structure 200 and the mating structure 160 may be complementary to each other. For example, the engagement structure 200 is the protrusions 228 and the mating structure 160 is the grooves 164 formed in the body 150 of the fuel injector 142. In such a case, the engagement structure 200 is inserted within the mating structure 160 to align the plurality of ducts 146 with the plurality of orifices 154. In another example, the engagement structure 200 may be one or more grooves (not shown) formed into the first ring structure 170. The groove may extend from the inner circumferential surface 180, in a radial direction, towards the outer circumferential surface 182. In such a case, the mating structure 160 may be one or more protrusions (not shown) extending radially outwardly from an outer periphery 162 of the body 150 of the fuel injector 142, and may be configured to engage the grooves (not shown) formed into the first ring structure 170 to align the orifices 154 to the ducts 146. In some implementations, both the engagement structure 200 and the mating structure 160 may be protrusions extending respectively from the inner circumferential surface 180 of the first ring structure 170 and the outer periphery 162 of the body 150 of the fuel injector 142 to engage and align the orifices 154 to the ducts 146. The ducts 146 and the orifices 154 are aligned with each other when the engagement structure 200 and the mating structure 160 contact each other. Although protrusions and grooves are contemplated as the engagement structure 200 and/or the mating structure 160, it may be appreciated that other structures such as splines, keys, and other similar structures that facilitates an alignment of the ducts 146 with the orifices 154 may also be possible.

Additionally, or optionally, the first ring structure 170 may include a locking structure 230 (best shown in FIG. 4) configured to engage the first ring structure 170, and therefore the duct structure 144, to the cylinder head 106. The locking structure 230, when engaged with the cylinder head 106, is configured to restrict a rotation of the first ring structure 170, and therefore the duct structure 144, about the central axis 174, to restrict a rotation of the first ring structure 170 and the duct structure 144 relative to the cylinder head 106. The locking structure 230 is configured to engage and couple with a coupling structure 232 (best shown in FIG. 6) of the cylinder head 106 to restrict the rotation of first ring structure 170, and therefore the duct structure 144, about the central axis 174 and relative to the cylinder head 106.

In an embodiment, the locking structure 230 may include one or more grooves 234 (three shown in FIG. 4) extending axially from the first end surface 184 of the first ring structure 170. In such a case, the coupling structure 232 may include one or more protrusions 236 (three shown in FIG. 6) extending axially outwardly into the combustion chamber 116 from the flame deck surface 130 of the cylinder head 106. The locking structure 230 and the coupling structure 232 may be complementary to each other in certain other implementations, the locking structure 230 may include one or more protrusions (not shown) and the coupling structure 232 may include one or more grooves (not shown) in which the protrusions are inserted. Although one or more protrusions and one or more grooves are contemplated as the locking structure 230 and/or the coupling structure 232, it may be appreciated that other structures such as splines, keys, and other similar structures that facilitates an engagement of the first ring structure 170 and the duct structure 144 and the cylinder head 106 and restrict prevent a relative movement/rotation of the duct structure 144 with respect to the cylinder head 106 may also be possible. In certain other implementations, the locking structure 230 may extend radially from the outer circumferential surface 182. In such cases, the first ring structure 170 may extend at least partly into a bore (not shown) formed in the cylinder head 106 to couple the duct structure 144 with the cylinder head 106, and the coupling structure 232 may extend radially front an inner surface of the bore of the cylinder head 106.

INDUSTRIAL APPLICABILITY

During assembly, the duct structure 144 is coupled to the cylinder head 106. In an embodiment, the duct structure 144 is coupled to the flame deck surface 130 of the cylinder head 106 such that the first end surface 184 of the first ring structure 170 abuts the flame deck surface 130. In another embodiment, the duct structure 144 is coupled to the cylinder head 106 such that at least a portion of the first ring structure 170 is disposed within a bore formed in the cylinder head 106. Further, during assembly of the duct structure 144 with the cylinder head 106, the coupling structure 232 is engaged with the locking structure 230 to restrict a rotation of the duct structure 144 relative to the cylinder head 106 or the central axis 174. In the assembled position, the plurality of ducts 146 is disposed within the combustion chamber 116 of the engine 100.

Thereafter, the fuel injector 142 is assembled to the cylinder head 106 such that the tip portion 152 of the fuel injector 142 protrudes at least partly within the combustion chamber 116, and the longitudinal axis 166 of the fuel injector 142 aligns with the central axis 174 of the first ring structure 170. Therefore, the plurality of ducts 146 is disposed inside the combustion chamber 116 around the fuel injector 142.

Moreover, the fuel injector 142 is assembled such that fuel injector 142 engages with the duct structure 144 in such a manner that the engagement structure 200 engages and couples with the mating structure 160 to facilitate an alignment of the plurality of orifices 154 with the plurality of ducts 146. In an embodiment, the engagement and coupling of the engagement structure 200 with the mating structure 160 ensures an alignment of the duct axis 194 of each duct 146 with the orifice axis 196 of the one of the plurality of orifices 154. Such alignment of the ducts 146 with the orifices 154 ensures that the each of the plurality of ducts 146 receives fuel discharged from a corresponding one of the plurality of orifices 154. Although an assembly of the fuel injector 142 with the cylinder head 106 after an assembly of duct structure 144 with the cylinder head 106 is contemplated, it may be possible that the fuel injector 142 is assembled with the cylinder head 106 prior to a coupling of the duct structure 144 with the cylinder head 106. In certain other implementations, the fuel injector 142 and the duct structure 144 are assembled with each other, and thereafter the fuel injector assembly 140 is coupled with the cylinder head 106. In such a case, an engagement and coupling of the engagement structure 200 with the mating structure 160 is ensured during the assembly of the fuel injector 142 with the duct structure 144.

As the ducts 46 are aligned with the orifices 154, each duct 146 receives the fuel discharged by a corresponding one of the plurality of orifices 154. This ensures that a maximum amount of fuel enters the ducts 146, thereby reaching desired locations inside the combustion chamber 116. This ensure a proper combustion and flame propagation by facilitating proper mixing of the fuel with air, thereby reducing soot formation during operation of the engine 100.

What is claimed is:
1. A duct structure for a fuel injector assembly of an engine, the fuel injector assembly including a fuel injector having a plurality of orifices to discharge fuel, the duct structure comprising:
a first ring structure configured to be coupled to a cylinder head of the engine and defining a central axis;

a plurality of ducts circularly arrayed around the central axis, the plurality of ducts configured to provide passages to fuel discharged from the fuel injector;

a plurality of posts connecting the plurality of ducts to the first ring structure; and an engagement structure configured to engage with the fuel injector to align the plurality of ducts with the plurality of orifices such that each of the plurality of ducts is configured to receive fuel discharged from a corresponding one of the plurality of orifices.

2. The duct structure of claim 1, wherein the plurality of posts extends from the first ring structure in a direction substantially parallel to the central axis.

3. The duct structure of claim 1, wherein each duct of the plurality of ducts includes a duct axis, the engagement structure configured to align the duct axis of each duct with an orifice axis of the one of the plurality of orifices.

4. The duct structure of claim 1 further including a second ring structure disposed axially spaced apart from the first ring structure, the second ring structure being coupled to the plurality of ducts.

5. The duct structure of claim 4, wherein the second ring structure is formed by a plurality of arcuate sections, with each arcuate section of the plurality of arcuate sections connecting one duct to a successive duct along a circular array of the plurality of ducts.

6. The duct structure of claim 1, wherein the engagement structure includes one or more protrusions extending radially inwardly from the first ring structure.

7. The duct structure of claim 1, wherein the first ring structure includes a locking structure configured to engage the first ring structure to the cylinder head of the engine, and restrict a rotation of the first ring structure about the central axis.

8. A fuel injector assembly for an engine having a cylinder head, the fuel injector assembly comprising:

a fuel injector having a plurality of orifices to discharge fuel, and a mating structure disposed at an outer periphery of the fuel injector; and a duct structure including:
  a first ring structure configured to be coupled to the cylinder head of the engine and defining a central axis;
  a plurality of ducts circularly arrayed around the central axis, the plurality of ducts configured to provide passages to fuel discharged from the fuel injector;
  a plurality of posts connecting the plurality of ducts to the first ring structure; and
  an engagement structure engaged with the fuel injector, aligning the plurality of ducts with the plurality of orifices such that each duct is configured to receive fuel discharged from a corresponding one of the plurality of orifices.

9. The fuel injector assembly of claim 8, wherein the plurality of posts extends from the first ring structure in a direction substantially parallel to the central axis.

10. The fuel injector assembly of claim 8, wherein each duct of the plurality of ducts includes a duct axis, the engagement structure aligns the duct axis of each duct with an orifice axis of the one of the plurality of orifices.

11. The fuel injector assembly of claim 8 further inclucing a second ring structure disposed axially spaced apart from the first ring structure, the second ring structure being coupled to the plurality of ducts.

12. The fuel injector assembly of claim 11, wherein the second ring structure is formed by a plurality of arcuate sections, with each arcuate section of the plurality of arcuate sections connecting one duct to a successive duct along a circular array of the plurality of ducts.

13. The fuel injector assembly of claim 8, wherein
the engagement structure includes one or more protrusions extending radially inwardly from the first ring structure, and
the mating structure includes one or more grooves engaged with the one or more protrusions, aligning the plurality of ducts with the plurality of orifices.

14. The fuel injector assembly of claim 8, wherein the first ring structure includes a locking structure configured to engage the first ring structure to the cylinder head of the engine, and restrict a rotation of the first ring structure about the central axis.

15. An engine, comprising
a cylinder defining a cylinder bore;
a cylinder head coupled to the cylinder, and having a flame deck surface;
a combustion chamber defined between the flame deck surface and a piston crown of a piston disposed within the cylinder bore;
a fuel injector having a plurality of orifices to discharge fuel into the combustion chamber, and a mating structure disposed at an outer periphery of the fuel injector; and
a duct structure disposed within the combustion chamber, the duct structure including:
  a first ring structure coupled to the cylinder head and defining a central axis;
  a plurality of ducts circularly arrayed around the central axis, the central axis is aligned with a longitudinal axis of the fuel injector, the plurality of ducts providing passages to fuel discharged from the fuel injector;
  a plurality of posts connecting the plurality of ducts to the first ring structure; and
  an engagement structure engaged with the fuel injector, aligning the plurality of ducts with the plurality of orifices such that each duct is configured to recieve fuel discharged from a corresponding one of the plurality of orifices.

16. The engine of claim 15, wherein the plurality of posts extends from the first ring structure in a direction substantially parallel to the central axis.

17. The engine of claim 15, wherein each duct of the plurality of ducts includes a duct axis, the engagement structure aligns the duct axis of each duct with an orifice axis of the one of the plurality of orifices.

18. The engine of claim 15 further including a second ring structure disposed axially spaced apart from the first ring structure, the second ring structure being coupled to the plurality of ducts.

19. The engine of claim 15, wherein
the engagement structure includes one or more protrusions extending radially inwardly from the first ring structure, and
the mating structure includes one or more grooves engaged with the one or more protrusions, aligning the plurality of ducts with the plurality of orifices.

20. The engine of claim 15, wherein
the cylinder head includes a coupling structure, and
the first ring structure includes a locking structure engaged with the coupling structure, restricting a rotation of the first ring structure relative to the cylinder head.

* * * * *